(12) United States Patent
Liu et al.

(10) Patent No.: US 12,725,358 B2
(45) Date of Patent: Sep. 1, 2026

(54) METHODS FOR MODELLING AND MANAUFACTURING A DEVICE

(71) Applicant: Siemens Industry Software NV, Leuven (BE)

(72) Inventors: Jin Liu, Teddington (GB); Mahmood Alkhenaizi, Manama (BH); Byron Blackmore, Ottawa (CA); Robin Bornoff, Newbury (GB); Matthew Warner, Teddington (GB)

(73) Assignee: Siemens Industry Software NV, Leuven (BE)

( * ) Notice: Subject to any disclaimer, the term of this patent is extended or adjusted under 35 U.S.C. 154(b) by 118 days.

(21) Appl. No.: 18/628,668

(22) Filed: Apr. 5, 2024

(65) Prior Publication Data

US 2024/0346764 A1 Oct. 17, 2024

(30) Foreign Application Priority Data

Apr. 6, 2023 (EP) .................................... 23167085

(51) Int. Cl.
*G06T 17/20* (2006.01)

(52) U.S. Cl.
CPC .................................... *G06T 17/20* (2013.01)

(58) Field of Classification Search
CPC ....... G06T 17/20; G06F 30/28; G06F 30/392; G06F 2111/10; G06F 2113/08; G06F 2113/20; G06F 2119/08
See application file for complete search history.

(56) References Cited

U.S. PATENT DOCUMENTS

2008/0015827 A1* 1/2008 Tryon, III ............. G06F 11/008 703/2
2008/0162103 A1* 7/2008 White ................. G03F 7/70625 703/13
2012/0116735 A1* 5/2012 Guedon .................. G06F 30/23 703/2

(Continued)

OTHER PUBLICATIONS

Alkhenaizi, Mahmood, Byron Blackmore, and Mike Donnelly. "Applying Delphi-like CTM partitioning on Electrothermally Connected FANTASTIC BCI-ROMs." 2021 27th International Workshop on Thermal Investigations of ICs and Systems (Therminic). IEEE, 2021. pp. 1-7.

(Continued)

*Primary Examiner* — Michelle Chin
(74) *Attorney, Agent, or Firm* — Lempia Summerfield Katz LLC

(57) ABSTRACT

A method for modelling a thermal environment of an electronic device is provided. The method includes obtaining a volumetric mesh representation of a region of three-dimensional space including the electronic device and a surrounding medium. A computational model for modelling the thermal environment of the region of space is determined based on the mesh representation and a set of thermal parameters for the plurality of mesh cells, and the computational model is evaluated to determine the thermal environment in each mesh cell of the mesh representation. The computational model includes an embedding of a boundary condition independent reduced order model of at least one component of the electronic device into a model of the surrounding medium.

17 Claims, 4 Drawing Sheets

(56) References Cited

U.S. PATENT DOCUMENTS

| | | | | |
|---|---|---|---|---|
| 2013/0167103 | A1* | 6/2013 | Burrell | G06F 30/23 716/136 |
| 2021/0209272 | A1* | 7/2021 | Xie | G06F 30/39 |
| 2022/0309199 | A1* | 9/2022 | Rao | G06F 30/20 |

OTHER PUBLICATIONS

Blackmore, Byron, Mike Donnelly, and Mahmood Alkhenaizi. "Including Electrothermal Effects in Electronics Design with Connected FANTASTIC BCI-ROMs." 2021 37th Semiconductor Thermal Measurement, Modeling & Management Symposium (SEMI-THERM). IEEE, 2021. pp. 78-88.

Monier-Vinard, Eric, et al. "Latest developments of compact thermal modeling of system-in-package devices by means of Genetic Algorithm." Fourteenth Intersociety Conference on Thermal and Thermomechanical Phenomena in Electronic Systems (ITherm). IEEE, 2014. pp. 998-1006.

Stafford, Jason, Ronan Grimes, and David Newport. "Development of compact thermal-fluid models at the electronic equipment level." vol. 4. (2012): 031007. pp. 1-14.

* cited by examiner

METHODS FOR MODELLING AND MANUFACTURING A DEVICE

This application claims the benefit of European Patent Application No. EP 23167085.2, filed on Apr. 6, 2023, which is hereby incorporated by reference in its entirety.

TECHNICAL FIELD

The present disclosure relates to methods for modelling and manufacturing a device and, in particular, for modelling a thermal environment of an electronic device and a surrounding medium.

BACKGROUND

In recent decades, the complexity of electronic devices has increased dramatically. This trend has been driven, for example, by the demand for higher performance consumer electronics devices. Modern smart phones include a wide range of electronics components supporting a vast array of functions including multiple processor cores, memory, storage devices, displays, batteries, sensors, camera devices, audio, biometric and wireless communication components.

The inclusion of so many interconnected components on a single PCB in an enclosed space raises a number of concerns for manufacturers and designers. Devices such as smart phones exhibit complex thermal behavior that may affect the performance and safety of the device. For example, overheating may cause a device to slow down, cause parts to malfunction and, in the worst case, lead to device failure. Manufacturers have therefore employed thermal modelling techniques to simulate the thermal operating environment of their devices.

Computational fluid dynamics (CFD) modelling techniques may be used to provide detailed thermal models of a thermal operating environment of a system or device. A CFD model uses numerical methods to solve equations that describe the behavior of fluids in a specific domain or geometry. In a CFD model, the domain is discretized into a mesh of small volumes or mesh cells. The equations are solved iteratively in each mesh cell, taking into account fluid properties such as velocity, pressure, temperature, and density at each point in time. The model calculates how these properties change as the fluid flows through the domain over time. CFD models provide accurate predictions of thermal behavior through a domain. Unfortunately, such models are computationally expensive.

A further issue arises in manufacturing supply chains. OEMs who produce integrated circuits (ICs) do not want to reveal the internal structures of their IC designs. If a company further down the supply chain wants to do thermal modelling with devices that incorporate one of these ICs, then the company will either have to sign non-disclosure agreements with the OEM or use models that do not reveal the internal chip structure. In the latter case, such models cannot incorporate full CFD modelling.

Compact thermal models (CTM) provide a mathematical representation of the thermal behavior of an integrated circuit that captures the essential thermal characteristics of the IC without revealing the internal topology of underlying circuit. CTMs allow designers to quickly predict the temperature rise and thermal performance of a device or system under different operating conditions, without the need for expensive and time-consuming physical testing.

Compact thermal models may be classified in terms of whether the model is stand-alone or embeddable. In a stand-alone model, the surrounding thermal operating environment is assumed and prescribed. In contrast, an embeddable model is a model that may be embedded in a model of the surrounding thermal operating environment such as a CFD model. CTMs may further be classified in terms of whether the model is steady state or dynamic. In a steady state model, the boundary conditions are assumed to be constant and unchanging. In contrast, dynamic models may incorporate changing boundary conditions. A model is boundary condition independent (BCI) if the model predicts temperature in space and time regardless of the thermal environment, characterized by heat transfer coefficients (HTCs) and local ambient air temperature in which it is placed.

Equivalent thermal circuit models are a form of embeddable CTM that seeks to model the thermal behavior of a real IC using components that mimic the thermal behavior of the IC. The two standardized approaches are the Two Resistor (2R) and DELPHI models. These models are based on the use of an equivalent thermal resistor network. Each approach has its benefits and limitations, with the accuracy for both approaches not known prior to their creation. Both models allow for a relatively short creation time, with the DELPHI model having a higher level of complexity in the derived thermal resistor network.

In recent years, due to the increase in complexity of modern IC package design, where the presence of multiple heat sources within a single package has become commonplace, these models have become outdated. Neither the Two Resistor (2R) nor DELPHI models support more than a single heat source in the thermal resistor network. Further, both CTMs can only be used in steady state analysis, whereas in the modern electronics industry, transient analysis of ICs is prominent to fully capture the thermal behavior and identify failure modes. In addition, only the DELPHI model purports to be boundary condition independent (BCI) where its accuracy is independent from its thermal environment.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for modelling a thermal environment of an electronic device and a surrounding medium is provided.

According to a first aspect, a computer-implemented method for modelling a thermal environment of an electronic device is provided. The method includes obtaining a volumetric mesh representation of a region of three-dimensional space including the electronic device and a surrounding medium. The volumetric representation includes a plurality of three-dimensional mesh cells. The method includes determining a computational model for modelling the thermal environment of the region of space based on the mesh representation and a set of thermal parameters for the plurality of mesh cells, and evaluating the computational model to determine the thermal environment in each mesh cell of the mesh representation. The computational model includes an embedding of a boundary condition independent reduced order model (BCI-ROM) of at least one component of the electronic device into a model of the surrounding medium.

The method according to the first aspect enables a BCI-ROM of a heat source such as an integrated circuit in a device to be embedded in a thermal model such as a CFD model of the surrounding medium. Solving the BCI-ROM in-situ, within a heat transfer CFD model, increases the accuracy of the resulting BCI-ROM prediction compared to a 'stand-alone' model.

According to a second aspect, a method manufacturing a device including one or more electronic components and a packaging enclosing the one or more electronic components is provided. The method includes providing a computational model of the thermal environment of the device, evaluating the computational model to determine the thermal environment, modifying a design of the device based on the evaluating, and manufacturing the device based on the modified design. The computational model includes an embedding of a boundary condition independent reduced order model (BCI-ROM) of one or more of the electronic components into a thermal model of the packaging and the surrounding medium.

The method according to the second aspect improves the design of electronics devices. For example, modelling based on the embedding of a BCI-ROM reduces the risk of component failure. Further, the method reduces the environmental cost of manufacturing electronics devices, as the need for over-engineered devices to compensate for low quality and inaccurate modelling is reduced.

According to a third aspect, a computer program including code that, when executed by a data processing system, causes the data processing system to carry out the acts of the method according to the first aspect is provided.

In a first implementation form of the method according to the first aspect, the model of the surrounding medium includes a computational fluid dynamics (CFD) model.

In a second implementation form, the BCI-ROM includes a system of a first number, r, of equations derived from a computational model of the thermal environment represented as a system of a second number, N, of simultaneous linear equations, where the first number, r, is less than the second number, N.

In a third implementation form, determining the computational model includes determining a model of thermal behavior in each mesh cell of the region.

In a fourth implementation form, the thermal behavior is modelled according to equations of temperature, pressure, velocity, and turbulence.

In a fifth implementation form, the temperature is determined according to:

$$\begin{bmatrix} M_1 & 0 \\ 0 & \hat{M}_2 \end{bmatrix} \begin{bmatrix} \frac{dT_1}{dt} \\ \frac{d\hat{x}_2}{dt} \end{bmatrix} + \begin{bmatrix} K_1 + S_{B1}H_{B1}S_{B1}^T & -S_{B1}H_{B1}V_{B2} \\ -V_{B2}^T H_{B1}S_{B1}^T & \hat{K}_2 + V_{B2}^T H_{B1}V_{B2} \end{bmatrix} \begin{bmatrix} T_1 \\ \hat{x}_2 \end{bmatrix} = \begin{bmatrix} g_1 \\ \hat{g}_2 \end{bmatrix}$$

where $T_1$ includes CFD cell temperatures, $\hat{x}_2$ includes BCI-ROM cell temperatures, and $M_1$, $\hat{M}_2$, $K_1$, $\hat{K}_2$, $S_{B1}$, $H_{B1}$, $V_{B2}$, $g_1$ and $\hat{g}_2$, are thermal parameters.

In a sixth implementation form, the method according to the first aspect includes modelling BCI-ROM cells as insulated solids in equations for pressure, velocity, and turbulence.

In a seventh implementation form, the method according to the first aspect includes modelling conductive, convective, and radiative heat exchange between the BCI-ROM and the CFD model.

In an eighth implementation form, modelling radiative heat exchange includes modelling faces of mesh cells in the BCI-ROM as an orthotropic material.

In a ninth implementation form, the electronic device includes a plurality of heat sources.

These and other aspects of the invention will be apparent from the embodiments described below.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
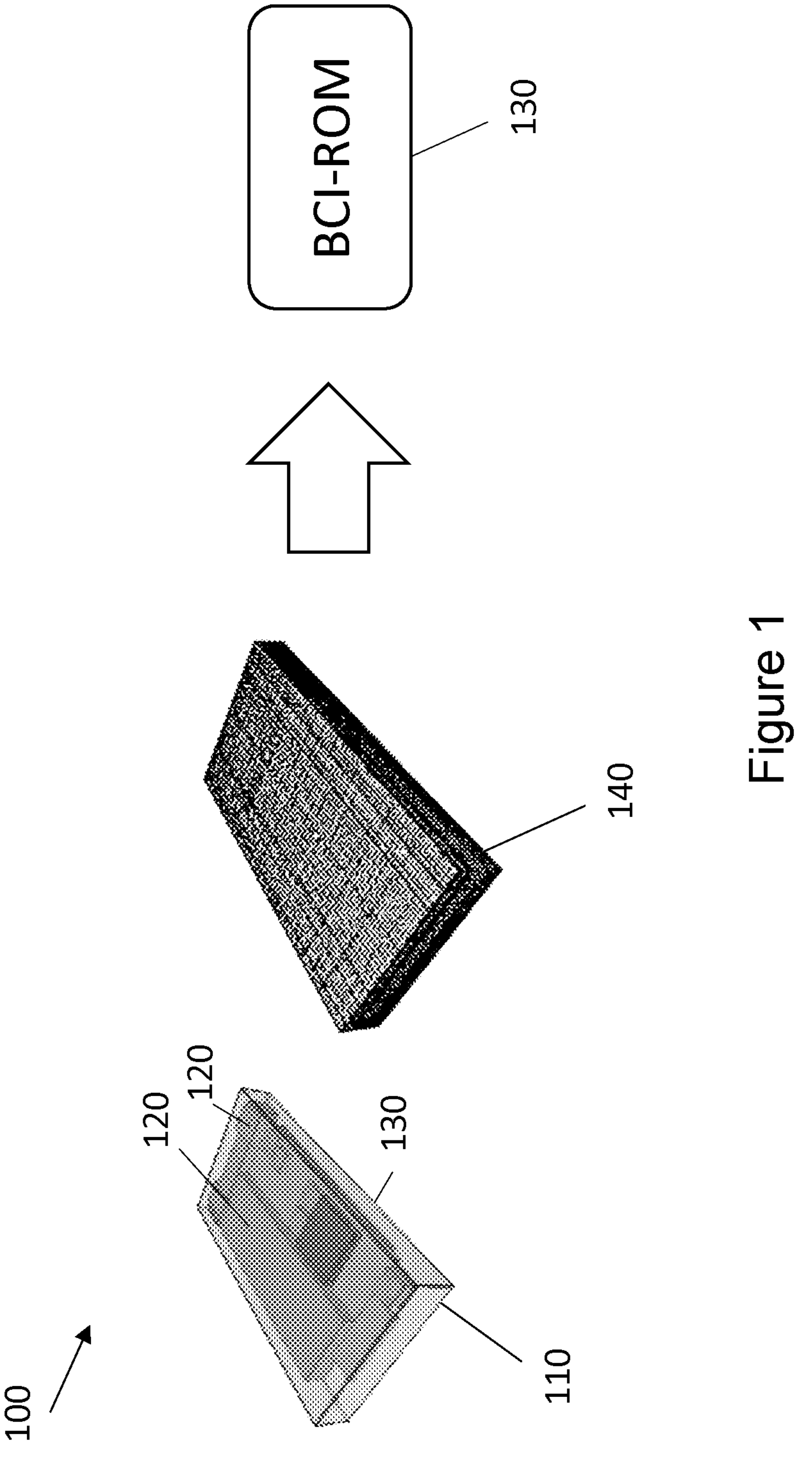
FIG. 1 is a diagram showing a reduced order model (ROM) extraction process, according to an example.

Example embodiments are described below in sufficient detail to enable those of ordinary skill in the art to embody and implement the systems and processes herein described. Embodiments may be provided in many alternate forms and should not be construed as limited to the examples set forth herein.

Accordingly, while embodiments may be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent; however, the use of the singular form in the present document should not preclude the presence of more than one referent. In other words, elements referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms including technical and scientific terms used herein are to be interpreted as is customary in the art. It will be further understood that terms in common usage should also be interpreted as is customary in the relevant art and not in an idealized or overly formal sense unless expressly so defined herein.

FIG. 1 is a diagram showing a reduced order model (ROM) extraction process, according to an example. Reduced order modelling is an approach to extracting a dynamic CTM from a thermal simulation model. FIG. 1 shows an electronic device 110. The electronic device 110 includes electronic components 120. The electronic components 120 may include integrated circuits (ICs), processors, memory, storage devices, or any other electronics components. Interconnections between the components 120 may be provided via a physical medium such as PCB. The electronic device 120 includes a housing 130 that surrounds the components 120.

In FIG. 1, a volumetric three-dimensional mesh 140 including a plurality of three-dimensional mesh cells is generated. The volumetric mesh 140 represents the electronic device 110 without revealing the underlying circuit topology. The volumetric mesh 140 may be used as an input domain to model the thermal operating environment of the electronic device 110.

The thermal operating environment is simulated using a computational model including a set of N simultaneous linear equations that may be solved numerically to model the thermal characteristics of the electronic device 110 in space and time. The thermal characteristics may include quantities such as temperature, pressure, fluid flow, fluid turbulence, and any other thermal properties of the electronic device 110, components 120, interconnects, junctions, and surrounding media including the air circulating within the electronic device 110. The computational model may be used to model different heat transfer mechanisms including conductive, convective, and radiative heat transfer. In some cases, the computational model may include a Computational Fluid Dynamics model.

According to examples described herein, a reduced order model (ROM) 150 is a system of r equations derived from the original set of N equations of the initial computational model. An example of a derivation of a ROM is provided in the paper "Matrix Reduction Tool for Creating Boundary Condition Independent Dynamic Compact Thermal Models," September 2015, 21st International Workshop on Thermal Investigations of ICs and Systems (THERMINIC). The ROM models the thermal characteristics in a domain in space and time within a specified tolerance of the original set of N equations. The computational resources required to solve the ROM are significantly lower than the original set of equations, as the number of equations, r, in the ROM may be much smaller than the original set of N equations. For example, N may be of the order 103 to 108, and r may be of the order 10 to 103.

A ROM model that is boundary condition independent, herein referred to as a BCI-ROM, is a ROM that models the thermal characteristics of a domain in space and time with accuracy regardless of the background thermal environment, where the thermal environment is characterized by a heat transfer coefficient and a local ambient air temperature.

Figure 2:
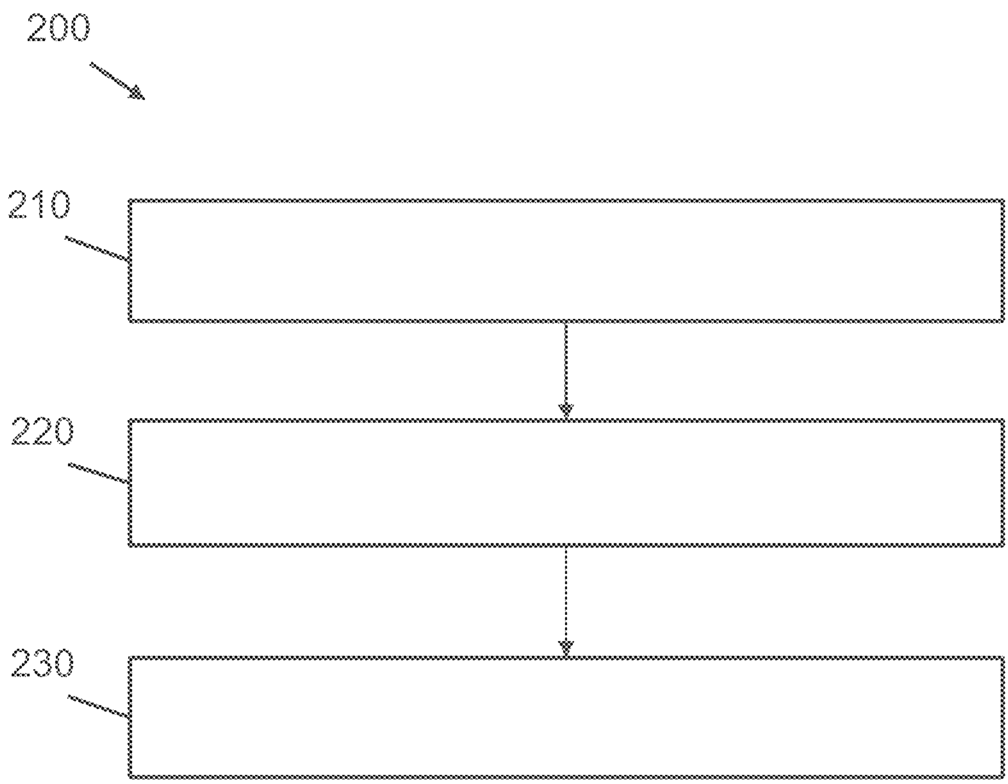
FIG. 2 shows a flow diagram of a method for modelling a thermal environment of an electronic device, according to an example.

FIG. 2 shows a flow diagram of a computer-implemented method 200 for modelling a thermal environment of an electronic device according to an example. The method 200 may be implemented in conjunction with the other methods and examples described herein. The method 200 is applied to a region of three-dimensional space including an electronic device and surrounding medium.

At block 210, the method 200 includes obtaining a volumetric mesh representation of the region. The volumetric mesh representation includes a plurality of three-dimensional mesh cells, such as mesh 140 shown in FIG. 1. In some cases, obtaining a volumetric mesh representation includes generating a mesh representation. In other cases, obtaining a volumetric mesh representation includes receiving the mesh representation from an external entity or, for example, accessing the mesh representation from a storage device.

At block 220, the method 200 includes determining a computational model for modelling the thermal environment of the region of space based on the mesh representation and a set of parameters for the plurality of mesh cells. The computational model includes an embedding of a boundary condition independent reduced order model (BCI-ROM) of at least one component of the electronic device into a model of the surrounding medium. The model of the surrounding medium may be a CFD model.

The computational model may include a model of thermal behavior in each mesh cell of the region. The thermal behavior is modelled according to equations for temperature, pressure, velocity components, turbulence, and other thermal characteristics. The temperature equation for the CFD model is directly coupled with the BCI-ROM temperature equation by removing CFD mesh cells occupied by the BCI-ROM volume. The CFD temperature equation matrix is extended with a dense sub-matrix for the BCI-ROM, and linking coefficients are determined on all CFD cell faces that are adjacent to any ROM volume cell.

According to examples, the temperature is determined according to:

$$\begin{bmatrix} M_1 & 0 \\ 0 & \hat{M}_2 \end{bmatrix} \begin{bmatrix} \frac{dT_1}{dt} \\ \frac{d\hat{x}_2}{dt} \end{bmatrix} \begin{bmatrix} K_1 + S_{B1} H_{B1} S_{B1}^T & -S_{B1} H_{B1} V_{B2} \\ -V_{B2}^T H_{B1} S_{B1}^T & \hat{K}_2 + V_{B2}^T H_{B1} V_{B2} \end{bmatrix} \begin{bmatrix} T_1 \\ \hat{x}_2 \end{bmatrix} = \begin{bmatrix} g_1 \\ \hat{g}_2 \end{bmatrix} \tag{1}$$

In equation (1), $T_1$ includes CFD cell temperatures, $\hat{x}_2$ includes BCI-ROM cell temperatures, and $M_1$, $\hat{M}_2$, $K_1$, $\hat{K}_2$, $S_{B1}$, $H_{B1}$, $V_{B2}$, $g_1$, and $\hat{g}_2$ are thermal parameters as follows:

$M_1$—CFD cell thermal mass $\hat{M}_2$—ROM thermal mass in ROM space $K_1$—CFD temperature stiffness matrix $\hat{K}_2$—ROM temperature matrix in ROM space $S_{B1}$—Link coefficients between CFD and ROM $H_{B1}$—Half cell conductance between CFD cell centers to ROM faces $V_{B2}$—Projection matrix from ROM space to ROM external faces $g_1$—CFD source term $g_2$—ROM source term in ROM space The cells occupied by the BCI-ROM are treated as thermally insulated solids for all other equations such as the pressure and velocity equations. Because of this approach, individual CFD cells touching the BCI-ROM are linked to original BCI-ROM cells, so heat is exchanged between the BCI-ROM and the surrounding model, throughout the numerical solution process.

At block 230, the method 200 includes evaluating the computational model to determine the thermal environment in each mesh cell of the mesh representation. According to examples, evaluating the computational model to determine the thermal environment may include solving the model of thermal behavior in each mesh cell of the region.

According to examples, The BCI-ROM may exchange heat with the CFD model by conduction if the BCI-ROM abuts a conducting solid object in the CFD model, convection if the BCI-ROM abuts a fluid in the CFD model such as the ambient air, or radiation if a face or faces of the BCI-ROM has a line of sight to another solid object in the CFD model. The BCI-ROM may exchange heat with another BCI-ROM if the BCI-ROM and the other BCI-ROM abut.

Radiative properties may be modelled by attaching a thin thermal conducting plate in the model to each of the BCI-ROM cell faces. The plates are assigned with orthotropic material properties, with very low thermal conductivity within the plane, and very high conductivity normal to the plane. This material also has very low thermal capacitance to minimize the influence of transient solutions.

The method 200 enables a BCI-ROM of a heat source such as an integrated circuit in a device to be embedded in a thermal model such as a CFD model of the surrounding medium. The method provides an implicit numerical solution where equations for thermal characteristics such as the temperature, pressure, velocity, and turbulence in the region are solved iteratively. By solving the BCI-ROM 'in-situ', within a 3D conjugate heat transfer CFD model, the variation of heat transfer coefficients, and the local ambient temperatures, are themselves also solved for. This increases the accuracy of the resulting BCI-ROM prediction compared to a 'stand-alone' model.

Figure 3:
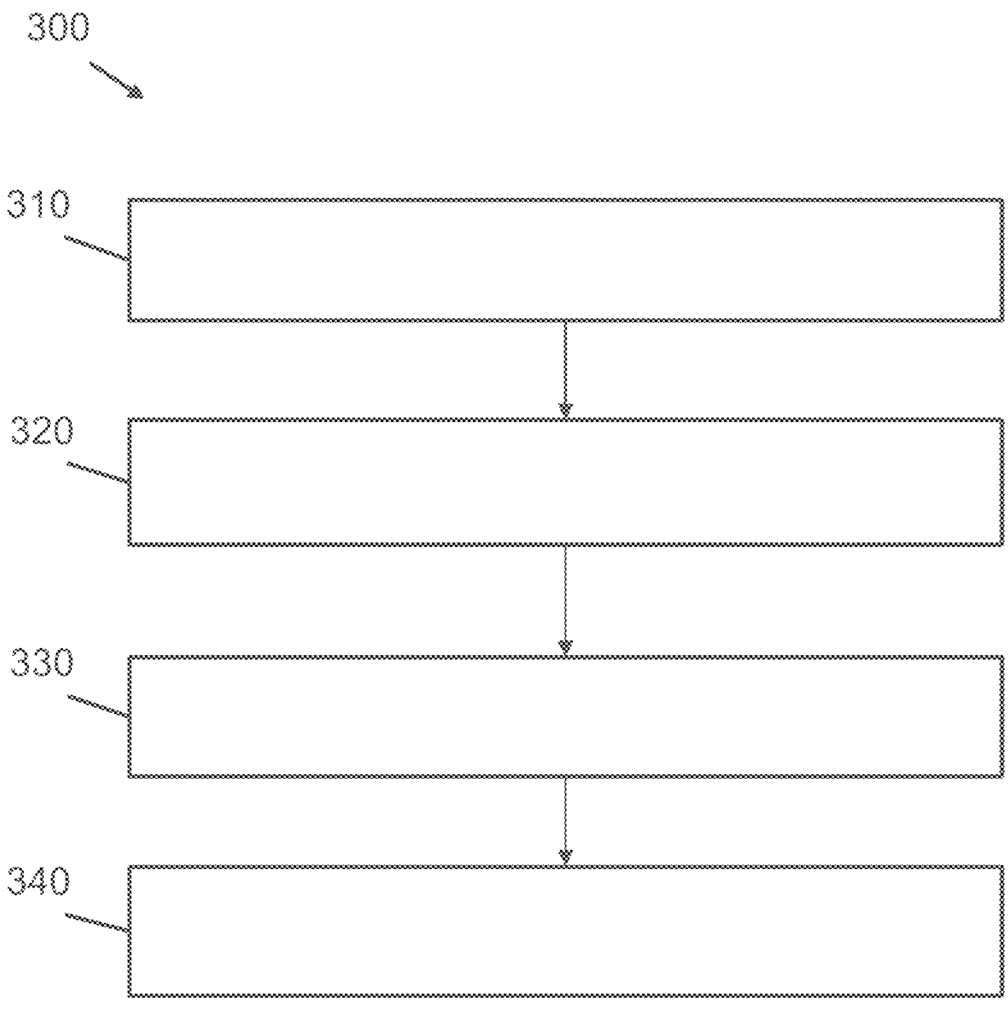
FIG. 3 shows a flow diagram of a method of manufacturing an electronic device, according to an example.

FIG. 3 shows a flow diagram of a method 300 for manufacturing an electronic device including one or more electronic components and a packaging enclosing the electronic components, according to an example. The method 300 may be implemented in conjunction with the other methods and examples described herein.

At block 310, the method 300 includes providing a computational model of the thermal environment of the device. According to examples, the computational model includes an embedding of a boundary condition independent reduced order model (BCI-ROM) of each of the electronic components into a thermal model of the packaging and the surrounding medium. In examples, the thermal model of the packaging and surrounding media includes a computational fluid dynamics model.

The computational model may be determined using the method 200 described previously. For example, the computational model may be determined by obtaining a volumetric mesh representation of the electronic device and surrounding medium, and determining the model based on the mesh representation and a set of thermal parameters for the plurality of mesh cells.

At block 320, the method includes evaluating the computational model to determine the thermal environment of the device. When the method 200 is employed in conjunction with the method 300, evaluating the computational model to determine the thermal environment may include solving the model in each mesh cell for the mesh representation of the device.

At block 330, the method includes, modifying a design of the device based on the evaluation. According to examples, modifying the design may include modifying the layout of the one or more electronic components, the packaging, the surrounding medium, or any combination thereof. A modification may be in response to the computational model indicating that a component is overheating, for example.

At block 340, the method includes manufacturing the device based on the modified design.

The method 300 of manufacturing a device shown in FIG. 3 may be used in the manufacturing process to improve the design of the device. The use of high quality and efficient modelling based on the embedding of a BCI-ROM reduces the risk of component failure. Further, the method reduces the environmental cost of manufacturing electronics devices, as the need for over-engineered cooling systems to compensate for low quality and inaccurate modelling is reduced.

The present disclosure is described with reference to flow charts and/or block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. Each flow and/or block in the flow charts and/or block diagrams, as well as combinations of the flows and/or diagrams in the flow charts and/or block diagrams may be realized by machine readable instructions.

The machine-readable instructions may, for example, be executed by a general-purpose computer, a special purpose computer, an embedded processor, or processors of other programmable data processing devices to realize the functions described in the description and diagrams. For example, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set, etc. The methods and modules may all be performed by a single processor or divided amongst a number of processors.

Figure 4:
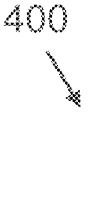
FIG. 4 shows a simplified schematic diagram of a computing system, according to an example.
Figure 4:
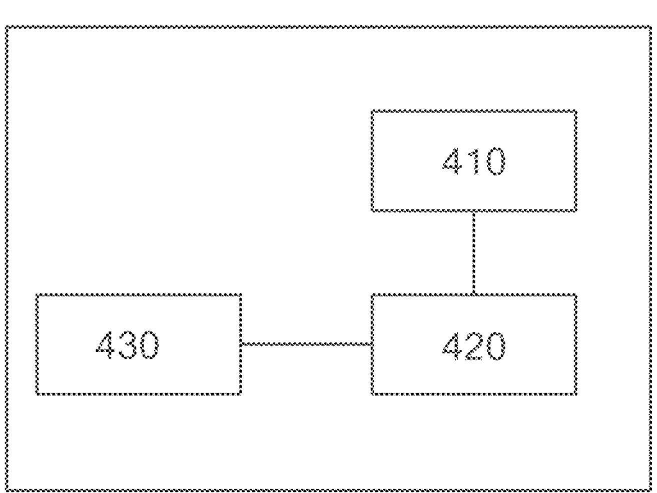

Such machine-readable instructions may also be stored in a computer readable storage that may guide the computer or other programmable data processing devices to operate in a specific mode. FIG. 4 shows an example 400 of a processor 410 associated with a memory 420. The memory 420 includes computer readable instructions 430 that are executable by the processor 410.

The instructions 430 cause the processor 410 to obtain a volumetric mesh representation of a region of three-dimensional space including an electronic device and a surrounding medium. The volumetric representation includes a plurality of three-dimensional mesh cells. The instructions 430 cause the processor to determine a computational model for modelling the thermal environment of the region of space based on the mesh representation and a set of thermal parameters for the plurality of mesh cells. The computational model includes an embedding of a boundary condition independent reduced order model (BCI-ROM) of at least one component of the electronic device into a model of the surrounding medium. The instructions 430 cause the processor to evaluate the computational model to determine the thermal environment in each mesh cell of the mesh representation.

Such machine-readable instructions may also be loaded onto a computer or other programmable data processing devices, so that the computer or other programmable data processing devices perform a series of operations to produce computer-implemented processing; thus, the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and including a plurality of instructions for making a computer device implement the methods recited in the examples of the present disclosure.

The present inventions may be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for modelling a thermal environment of an electronic device, the method being computer-implemented and comprising:

obtaining a volumetric mesh representation of a region of three-dimensional space comprising the electronic device and a surrounding medium, the volumetric mesh representation comprising a plurality of three-dimensional mesh cells;

determining a computational model for modelling the thermal environment of the region of three-dimensional space based on the volumetric mesh representation and a set of thermal parameters for the plurality of three-dimensional mesh cells; and determining the thermal environment in each mesh cell of the plurality of three-dimensional mesh cells of the volumetric mesh representation, the determining of the thermal environment in each mesh cell of the plurality of three-dimensional mesh cells comprising evaluating the computational model, wherein the computational model comprises an embedding of a boundary condition independent reduced order model (BCI-ROM) of at least one component of the electronic device into a model of the surrounding medium.

2. The method of claim 1, wherein the model of the surrounding medium comprises a computational fluid dynamics (CFD) model.

3. The method of claim 2, further comprising determining the computational model, the determining of the computational model comprising determining a model of thermal behavior in each mesh cell of the plurality of three-dimensional mesh cells of the region of three-dimensional space.

4. The method of claim 3, wherein the thermal behavior is modelled according to equations of temperature, pressure, velocity, and turbulence.

5. The method of claim 4, wherein the temperature is determined according to:

$$\begin{bmatrix} M_1 & 0 \\ 0 & \hat{M}_2 \end{bmatrix} \begin{bmatrix} \frac{dT_1}{dt} \\ \frac{d\hat{x}_2}{dt} \end{bmatrix} + \begin{bmatrix} K_1 + S_{B1} H_{B1} S_{B1}^T & -S_{B1} H_{B1} V_{B2} \\ -V_{B2}^T H_{B1} S_{B1}^T & \hat{K}_2 + V_{B2}^T H_{B1} V_{B2} \end{bmatrix} \begin{bmatrix} T_1 \\ \hat{x}_2 \end{bmatrix} = \begin{bmatrix} g_1 \\ \hat{g}_2 \end{bmatrix},$$

and wherein $T_1$ comprises CFD cell temperatures, $\hat{x}_2$ comprises BCI-ROM cell temperatures, and $M_1$, $\hat{M}_2$, $K_1$, $\hat{K}_2$, $S_{B1}$, $H_{B1}$, $V_{B2}$, $g_1$, and $\hat{g}_2$ are thermal parameters.

6. The method of claim 4, further comprising modelling BCI-ROM cells as insulated solids in equations for pressure, velocity, and turbulence.

7. The method of claim 2, further comprising modelling conductive, convective, and radiative heat exchange between the BCI-ROM and the CFD model.

8. The method of claim 7, wherein modelling radiative heat exchange comprises modelling faces of mesh cells in the BCI-ROM as an orthotropic material.

9. The method of claim 1, wherein the BCI-ROM comprises a system of a first number, r, of equations derived from a computational model of the thermal environment represented as a system of a second number, N, of simultaneous linear equations, and wherein the first number, r, is less than the second number, N.

10. The method of claim 1, wherein the electronic device comprises a plurality of heat sources.

11. A method of manufacturing a device, the device comprising one or more electronic components and a packaging enclosing the one or more electronic components, the method comprising:

providing a computational model of a thermal environment of the device, the providing of the computation model of the thermal environment of the device comprising:

obtaining a volumetric mesh representation of a region of three-dimensional space comprising the device and a surrounding medium, the volumetric mesh representation comprising a plurality of three-dimensional mesh cells;

determining the computational model based on the volumetric mesh representation and a set of thermal parameters for the plurality of three-dimensional mesh cells, the computational model being for modelling the thermal environment of the region of three-dimensional space;

determining the thermal environment, the determining of the thermal environment comprising determining the thermal environment in each mesh cell of the plurality of three-dimensional mesh cells of the volumetric mesh representation, the determining of the thermal environment in each mesh cell of the plurality of three-dimensional mesh cells comprising evaluating the computational model, modifying a design of the device based on the evaluating; and manufacturing the device based on the modified design, wherein the computational model comprises an embedding of a boundary condition independent reduced order model (BCI-ROM) of at least one of the one or more electronic components into a thermal model of the packaging and the surrounding medium.

12. The method of claim 11, wherein the thermal model of the packaging and the surrounding medium comprises a computational fluid dynamics model.

13. The method of claim 11, wherein modifying the design comprises modifying a layout of the one or more electronic components, the packaging, the surrounding medium, or any combination thereof.

14. In a non-transitory computer-readable storage medium that stores instructions executable by one or more processors for modelling a thermal environment of an electronic device, the instructions comprising:

obtaining a volumetric mesh representation of a region of three-dimensional space comprising the electronic device and a surrounding medium, the volumetric mesh representation comprising a plurality of three-dimensional mesh cells;

determining a computational model for modelling the thermal environment of the region of three-dimensional space based on the volumetric mesh representation and a set of thermal parameters for the plurality of three-dimensional mesh cells; and determining the thermal environment in each mesh cell of the plurality of three-dimensional mesh cells of the volumetric mesh representation, the determining of the thermal environment in each mesh cell of the plurality of three-dimensional mesh cells comprising evaluating the computational model, wherein the computational model comprises an embedding of a boundary condition independent reduced order model (BCI-ROM) of at least one component of the electronic device into a model of the surrounding medium.

15. The non-transitory computer-readable storage medium of claim 14, wherein the model of the surrounding medium comprises a computational fluid dynamics (CFD) model.

16. The non-transitory computer-readable storage medium of claim 15, wherein the instructions further comprise determining the computational model, the determining of the computational model comprising determining a model of thermal behavior in each mesh cell of the plurality of three-dimensional mesh cells of the region of three-dimensional space.

17. The non-transitory computer-readable storage medium of claim 14, wherein the BCI-ROM comprises a system of a first number, r, of equations derived from a computational model of the thermal environment represented as a system of a second number, N, of simultaneous linear equations, and wherein the first number, r, is less than the second number, N.

* * * * *